United States Patent
Karra et al.

(10) Patent No.: US 11,293,279 B1
(45) Date of Patent: Apr. 5, 2022

(54) MULTI-FREQUENCY ELECTRICAL IMPEDANCE TOMOGRAPHY

(71) Applicant: Triad National Security, LLC, Los Alamos, NM (US)

(72) Inventors: Satish Karra, Los Alamos, NM (US); Hari S. Viswanathan, Los Alamos, NM (US); Maruti Kumar Mudunuru, Los Alamos, NM (US); Vamshi Krishna Chillara, Los Alamos, NM (US); Dipen N. Sinha, Bay Shore, NY (US)

(73) Assignee: Triad National Security, LLC, Los Alamos, NM (US)

( * ) Notice: Subject to any disclaimer, the term of this patent is extended or adjusted under 35 U.S.C. 154(b) by 497 days.

(21) Appl. No.: 16/419,350

(22) Filed: May 22, 2019

Related U.S. Application Data

(60) Provisional application No. 62/678,747, filed on May 31, 2018.

(51) Int. Cl.

| | |
|---|---|
| *E21B 49/00* | (2006.01) |
| *E21B 43/26* | (2006.01) |
| *G01V 3/24* | (2006.01) |
| *E21B 47/113* | (2012.01) |
| *G01F 1/60* | (2006.01) |

(52) U.S. Cl.
CPC .......... *E21B 47/113* (2020.05); *E21B 43/26* (2013.01); *G01F 1/60* (2013.01); *G01V 3/24* (2013.01)

(58) Field of Classification Search
CPC ........ E21B 43/26; E21B 43/305; E21B 49/00; G01V 3/24; G01V 3/08; G01V 3/26
USPC .................................................. 702/11–13
See application file for complete search history.

(56) References Cited

U.S. PATENT DOCUMENTS

| | | | | |
|---|---|---|---|---|
| 4,214,226 A * | 7/1980 | Narasimhan | ............. | G01V 1/20 181/102 |
| 6,294,917 B1 * | 9/2001 | Nichols | ..................... | G01V 3/28 324/339 |
| 6,731,114 B1 * | 5/2004 | Lagabrielle | ............... | G01V 3/24 324/347 |
| 9,568,635 B2 * | 2/2017 | Suhami | ..................... | G01V 3/30 |
| 10,534,103 B2 * | 1/2020 | Schmidt | ..................... | G01V 3/12 |
| 2014/0239957 A1 * | 8/2014 | Zhang | .................. | E21B 47/113 324/334 |

(Continued)

*Primary Examiner* — Kenneth L Thompson
(74) *Attorney, Agent, or Firm* — Klarquist Sparkman, LLP

(57) ABSTRACT

Apparatus includes a plurality of geological subsurface electrical line sensors spaced apart from each other proximate a predetermined geological subsurface region of interest, with at least one of the electrical line sensors situated as a line source to produce a multi-frequency electrical impedance tomography source signal, and with at least one of the electrical line sensors situated as a line detector to receive the multi-frequency electrical impedance tomography response signal associated with the source signal that propagates through the predetermined geological subsurface region of interest, and a controller including a processor and a memory configured with instructions that, when executed by the processor, cause the processor to determine an electrical mapping over the predetermined geological subsurface region of interest based on the multi-frequency electrical impedance tomography source signal, response signal, and the spatial positions of the geological subsurface electrical line sensors.

22 Claims, 8 Drawing Sheets

(56) References Cited

U.S. PATENT DOCUMENTS

| | | | |
|---|---|---|---|
| 2016/0102500 A1* | 4/2016 | Donderici | G01V 3/20 |
| | | | 175/24 |
| 2018/0292561 A1* | 10/2018 | Wilson | G01V 3/34 |
| 2018/0313200 A1* | 11/2018 | Lahat | E21B 47/00 |
| 2020/0200938 A1* | 6/2020 | Xiao | G01V 3/24 |

* cited by examiner

MULTI-FREQUENCY ELECTRICAL IMPEDANCE TOMOGRAPHY

CROSS REFERENCE TO RELATED APPLICATION

This application claims the benefit of U.S. Provisional Patent Application No. 62/678,747, filed May 31, 2018, and is incorporated herein by reference.

ACKNOWLEDGMENT OF GOVERNMENT SUPPORT

This invention was made with government support under Contract No. 89233218CNA000001 awarded by the U.S. Department of Energy/National Nuclear Security Administration. The government has certain rights in the invention.

FIELD

The field is multi-frequency electrical impedance tomography.

BACKGROUND

Electrical resistance tomography as applied in the geosciences generally suffers from various drawbacks that make it unsuitable for various applications. Therefore, a need remains for improved approaches without attendant drawbacks.

SUMMARY

According to an aspect of the disclosed technology, apparatus include a plurality of geological subsurface electrical line sensors spaced apart from each other proximate a predetermined geological subsurface region of interest, with at least one of the electrical line sensors situated as a line source to produce a multi-frequency electrical impedance tomography source signal, and with at least one of the electrical line sensors situated as a line detector to receive the multi-frequency electrical impedance tomography response signal associated with the source signal that propagates through the predetermined geological subsurface region of interest, and a controller including a processor and a memory configured with instructions that, when executed by the processor, cause the processor to determine an electrical mapping over the predetermined geological subsurface region of interest based on the multi-frequency electrical impedance tomography source signal, response signal, and the spatial positions of the geological subsurface electrical line sensors.

In some examples, the memory is configured with instructions that cause the processor to determine a variation over time of the electrical mapping that corresponds to a net hydrocarbon flow in the predetermined geological subsurface region of interest. In further examples, the memory is configured with instructions that cause the processor to determine a flow rate mapping over the predetermined geological subsurface region of interest based on the electrical mapping and an empirical relation between geological permeability and electrical conductivity.

In some embodiments, the predetermined geological subsurface region of interest is a horizontal fracking zone having a plurality of producing and/or non-producing stages. In further embodiments, the memory is configured with instructions that cause the processor to determine a production level of one or more stages of a horizontal fracking zone based on the electrical mapping. In some examples, the memory is configured with instructions that cause the processor to determine a production level of one or more stages of a horizontal fracking zone based on the electrical mapping. With particular embodiments, the controller is coupled to one or more fracking pumps coupled to one or more of the stages and configured to vary a pumping level of the one or more fracking pumps based on a flowrate estimate associated with the electrical mapping.

In some apparatus, at least one of the electrical line sensors is situated in an abandoned well bore. In some examples, the electrical line sensors are vertically arranged and approximately parallel to each other and the predetermined geological subsurface region of interest includes a horizontal fracking zone including a plurality of stages spaced apart along the horizontal fracking zone. In further examples, the multi-frequency source signal includes one or more of a tone burst, an electric pulse, or a continuous-wave signal. In particular examples, the electrical line sensors are spaced apart from each other in a sparse configuration.

Some example apparatus can further include a multiplexer electrically coupled to the subsurface electrical line sensors and configured to select which of the electrical line sensors is configured to send the source signal and which of the electrical line sensors are configured to receive the response signal, and a multi-frequency electrical source and a signal receiver coupled to the multiplexer.

According to another aspect of the disclosed technology, methods include directing a multi-frequency alternating-current electrical impedance tomography source signal from at least one geological subsurface electrical line sensor situated at a selected subsurface geological position, through an adjacent geological region, receiving a multi-frequency alternating-current electrical impedance tomography response signal at a plurality of other geological subsurface electrical line sensors at respective sparsely situated subsurface geological positions spaced apart from the at least one geological subsurface electrical line sensor providing the source signal, associated with the at least one geological subsurface electrical line sensor producing the source signal, and determining an electrical mapping over a predetermined geological region of interest of the adjacent geological region based on the multi-frequency alternating-current electrical impedance tomography source signal, response signal, and the spatial positions of the geological subsurface electrical line sensors.

In some examples, the determining of the electrical mapping includes determining variation of the electrical mapping over time. In some examples, methods further include determining a flow rate mapping over the predetermined geological region of interest based on the electrical mapping and an empirical relation between geological permeability and electrical conductivity. In particular examples, a production level of one or more stages of a horizontal fracking zone is determined based on the electrical potential mapping. In particular examples, methods can include varying a pump level of a stage of a horizontal fracking zone based on the determined production level.

In some examples, the source signal and response signal are, respectively, a current signal and a voltage signal, a voltage signal and a current signal, or voltage signals. In particular examples, the multi-frequency source signal includes one or more of a tone burst, an electric pulse, or a continuous-wave signal. In some embodiments, at least one of the line sensors is situated in an abandoned well bore. In further embodiments, each of the line sensors include a line sensor length of at least 1 meter situated at the corresponding subsurface geological positions at an end of a cable that extends from the end a length of at least 100 meters towards a surface.

According to some method examples, the directing the source signal includes directing the source signal from an AC source to a multiplexer situated to select one or more of the geological subsurface electrical line sensors for sending the source signal or receiving the response signal, wherein the receiving the response signal includes receiving the response signal from one or more of the electrical line sensors coupled to the multiplexer and directing the response signal from the multiplexer to a signal receiver. According to further examples, the predetermined geological region of interest corresponds to a fracking zone, a groundwater region, a geothermal region, or a carbon sequestration region.

The foregoing and other objects, features, and advantages of the disclosed technology will become more apparent from the following detailed description, which proceeds with reference to the accompanying figures.

DETAILED DESCRIPTION

Figure 1:
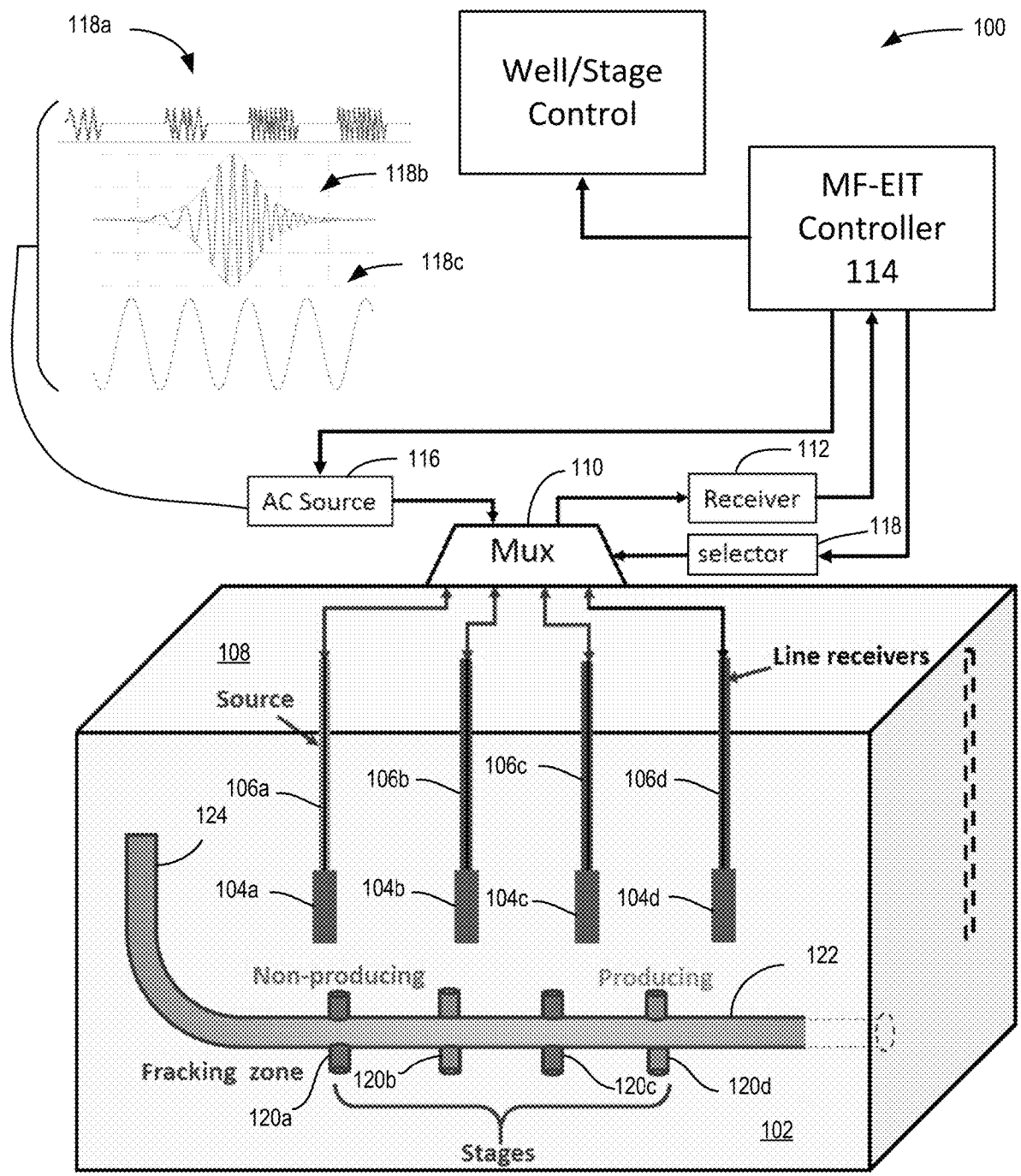
FIG. 1 is a perspective schematic of an example MF-EIT apparatus.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest," "best," "minimum," or the like. It will be appreciated that such descriptions are intended to indicate that a selection among many used functional alternatives can be made, and such selections need not be better, smaller, or otherwise preferable to other selections.

Existing geoelectrical sensing techniques are primarily based on electrical resistivity tomography (ERT) and utilize point sensors to obtain bulk subsurface electrical resistivity maps. Use of point sources results in less subsurface volumetric coverage due to smaller electric field penetration depth. Moreover, as ERT is based on direct current, it results in high resistive power losses. For these reasons, existing technology cannot efficiently be employed to monitor flowing stages in a horizontal well that requires large-scale subsurface interrogation.

The disclosed technology solves the several problems associated with electrical resistance tomography through the application of multi-frequency electrical impedance tomography (MF-EIT) methods and apparatus. Particular embodiments herein can be used so that hydrocarbon producing regions in a horizontal well can be identified and/or monitored, including for efficiency intelligence and feedback control. In some examples, such hydrocarbon producing regions can include horizontal fracking wells, which can be several thousand feet deep and are more than 10000 ft. long. In more general embodiments, oil and gas environments are examined, though other geological applications are also possible, including groundwater mapping, carbon sequestration, hazardous waste monitoring, etc.

To overcome the limitations posed by the point sources and direct current used in ERT, multi-frequency electrical impedance tomography (MF-EIT) can be performed using vertical line sensors for large-scale subsurface interrogation. Multi-frequency measurements using alternating current (AC) can lead to more robust sensing and detection over DC. Using AC current can also enable the characterization of frequency-dependent subsurface impedance that is generally sensitive to fluid concentration (e.g., hydrocarbon, fracking fluid, etc.). Electrical potential/impedance maps can be generated based on detection of multi-frequency electrical signals and used for enhanced detectability of hydrocarbon production zones. Advantages of using the approaches described herein can include detection of hydrocarbon flow characteristics. For example, the use of multiple frequency measurements can result in robust impedance maps to detect subsurface signatures pertaining to hydrocarbon flow, based on a correlation between subsurface electrical impedance variation over time and changes in the ratio of hydrocarbon to water in a mixture. Also, a time-varying spatial distribution of hydrocarbon/water across production stages of a well can enable quantification of net hydrocarbon flow. Additional advantages can include an increase in volumetric coverage as compared to point source measurement techniques, by positioning geoelectrical sensors around the fracking site rather than immediately above. Also, the use of existing abandoned wells as bore pathways for line sensors can provide resource-efficient and cost-effective monitoring. A significant advantage of using AC signals can include a substantial reduction in power requirements in producing MF-EIT signals. For example, power reductions of 10%, 20%, 50% or greater can be obtained by using AC line sensors over ERT approaches that use point sources. Such reductions in power requirements result in various other advantages to components of example MF-EIT systems, including lower weights of power sources, easier transport to on-site mining facilities and between well sites, smaller bore holes for power cables with lower power handling requirements, etc. Another significant advantage of using AC line sensors includes greater electrical field penetration associated with additional volume coverage with length.

FIG. 1 is an example of an MF-EIT configuration 100 that can be used to detect impedance characteristics in a subsurface geological region of interest 102. A plurality of line sensors 104a-104d are placed at predetermined subsurface positions and are coupled to the ends of respective power cables 106a-106d that extend from a surface 108 (e.g., a ground surface of the Earth). The line sensors 104a-104d generally extend a predetermined length substantially greater than their respective widths. For example, line sensor lengths of at least 10 cm, 1 m, 10 m, or 50 m, can be used in some examples, though longer lengths are also possible in subsurface applications. Shorter line sensor lengths can also be used in some examples, such as with experimental verification configurations or mock-ups at smaller dimensional scales, which can also be used for cross-validation. In general, increased line sensor length corresponds to an increased volume coverage of a subsurface geologic region to detect. Sparsity of the placed line sensors can also depend on length, as the increased volume coverage with length can reduce the quantity of line sensors required for a selected subsurface geologic region.

The power cables 106a-106d extend a sufficient length below the surface 108 so that the line sensors 104a-104d can be provided with power or so that signals received at the line sensors 104a-104d can be sent to the surface 108. For example, power cable lengths of 10 m, 100 m, 1000 m, 5000 m, or longer, can be possible, depending on the depth of the subsurface geological region of interest 102. Holes can be provided through various geological drilling techniques and can include existing wells or abandoned wells. Because the power cables 106a-106d and line sensors 104a-104d can have a generally small diameter or width dimension (e.g., less than 10 cm, 5 cm, 2 cm, etc.), micro holes can also be drilled specifically to provide the paths for inserting the power cables 106a-106d and line sensors 104a-104d using miniaturized oil and gas drilling devices, without the added expense and complexity associated with drilling larger holes typically associated with mining and exploration.

The power cables 106a-106d are coupled to a signal multiplexer 110 that combines multi-frequency response signals received from one or more of the line sensors 104a-104d and sends the received signals to a signal receiver 112. The signal receiver 112 conditions and directs the received response signals to a MF-EIT system controller 114. The MF-EIT system controller 114 is coupled to an AC source 116 that is configured to generate a MF-EIT signal, corresponding to a voltage or current, which can include one or more multi-frequency signal types, such as a tone burst 118a, a pulse 118b, or CW frequencies 118c. In typical examples, frequencies and/or frequency variations are selected in the range of 20 Hz to 2 MHz. Examples of the tone burst 118a typically include a finite number of cycles of a fixed frequency sine/cosine wave. Examples of the pulse 118b can include excitations with a selected frequency band (e.g., broad) that is localized in time. Example CW frequencies 118c generally correspond to a continuous waveform sine wave with a predetermined frequency and amplitude. The received signals include phase shifts and amplitude variations with respect to the generated and sent MF-EIT signal that are used in determining characteristics of the subsurface geological region of interest 102. The AC source 116 is coupled to the multiplexer 110 to send the MF-EIT signal to one or more of the line sensors 104a-104d selected with a selector control 118. In representative examples, one or more of the line sensors 104a-104d, e.g., line sensor 104a, operates as an EIT signal source and the other ones of the line sensors 104a-104d operate as detectors, e.g., line sensors 104b-104d. With the multiplexer 110, different ones of the line sensors 104a-104d can operate as signal sources or signal receiving sensors in a predetermined sequence.

The line sensors 104a-104d can be sparsely arranged in relation to the subsurface geological region of interest 102. For example, point sensors spaced less than 10 m can be considered densely placed, and sparse placement generally extends beyond that range, such as 50 m or 100 m in spacing, or greater. In a particular example, the subsurface geological region of interest 102 corresponds to a horizontal well fracking zone that includes a plurality of fracking stages 120a-120d coupled to a horizontal well 122 and surface-coupled through well output 124. The fracking stages 120a-120d can be categorized as producing (120b, 120d) or non-producing (120a, 120c) based on the amount of hydrocarbons that are received through the respective stage and out the well output 124. In different examples, there can be fewer, more, or the same number of fracking stages as there are line sensors. In some examples, adjacent line sensors (e.g., 104a, 104b) can be spaced apart by as much as 10 m, 50 m, or 100 m apart, and provide suitable EIT resolution for the subsurface geological region of interest 102 with respect to impedance, geological permeability, and hydrocarbon flowrate. In a fracking embodiment, the MF-EIT controller 114 can be configured to determine a time-varying electrical potential or impedance mapping across the subsurface geological region of interest 102. Based on an empirical relation between impedance and permeability and flow data from the well output 124, the MF-EIT controller 114 can be configured to estimate hydrocarbon production characteristics of the different fracking stages 120a-120d, and based on the estimates, direct a well/stage control 126 to vary a pumping level or other characteristics of the fracking stages 120a-120d and/or horizontal well 122.

Figure 2:
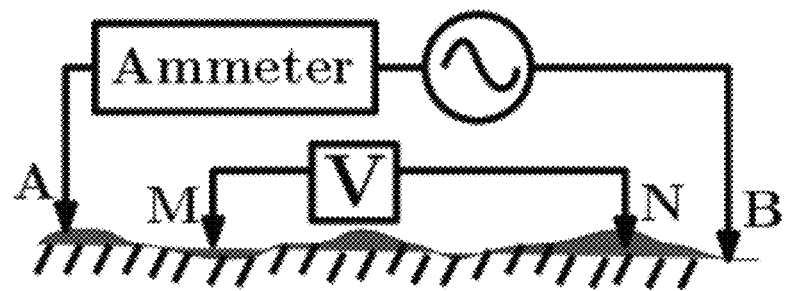
FIG. 2 shows side view schematics of example electrode array configurations.
Figure 2:
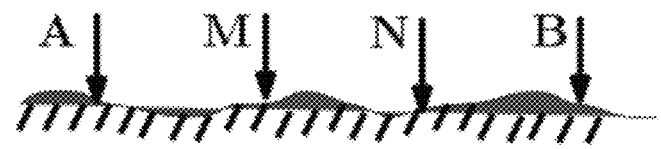
Figure 2:
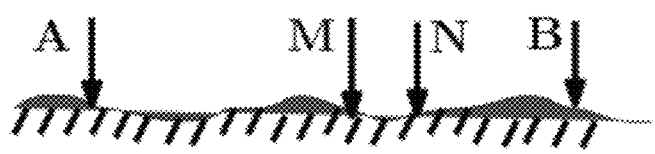
Figure 2:

FIG. 2 shows example modalities and electrode array configurations that can be used in example EIT methods and apparatus. In representative examples, a current signal at a selected frequency is directed to electrode sites A, B, and a voltage signal associated with the injected current that propagates through the geophysical medium is received at electrode sites M, N. However, other modalities can be used, including directing a voltage input signal to the electrode sites A, B, and receiving a current output signal at the electrode sites M, N, and directing a voltage input signal to the electrode sites A, B, and receiving a voltage output signal at the electrode sites M, N. In typical examples, the electrode sites A, B, M, N are linearly arranged and equally spaced, so as to correspond to a Wenner array. In other examples, other electrode array configurations can be used, or combinations of electrode array configurations can be used. In some example electrode array configurations, Schlumberger arrays can be used, which can have variable positions of the electrode sites M, N relative to fixed outer electrode positions A, B. In further examples, dipole-dipole arrays can be used in which transmitting electrode sites A, B and receiving electrode sites M, N are respectively paired and the pairs are spaced apart from each other. Electrode array configurations can also include arrays in which a current signal or other signal is directed to a single electrode site, and a response signal is received at multiple other electrode sites, such as with a pole-dipole array. Differences in the response signal received at the different electrode sites can be used to characterize the geophysical medium using inversion methods.

Figure 3:
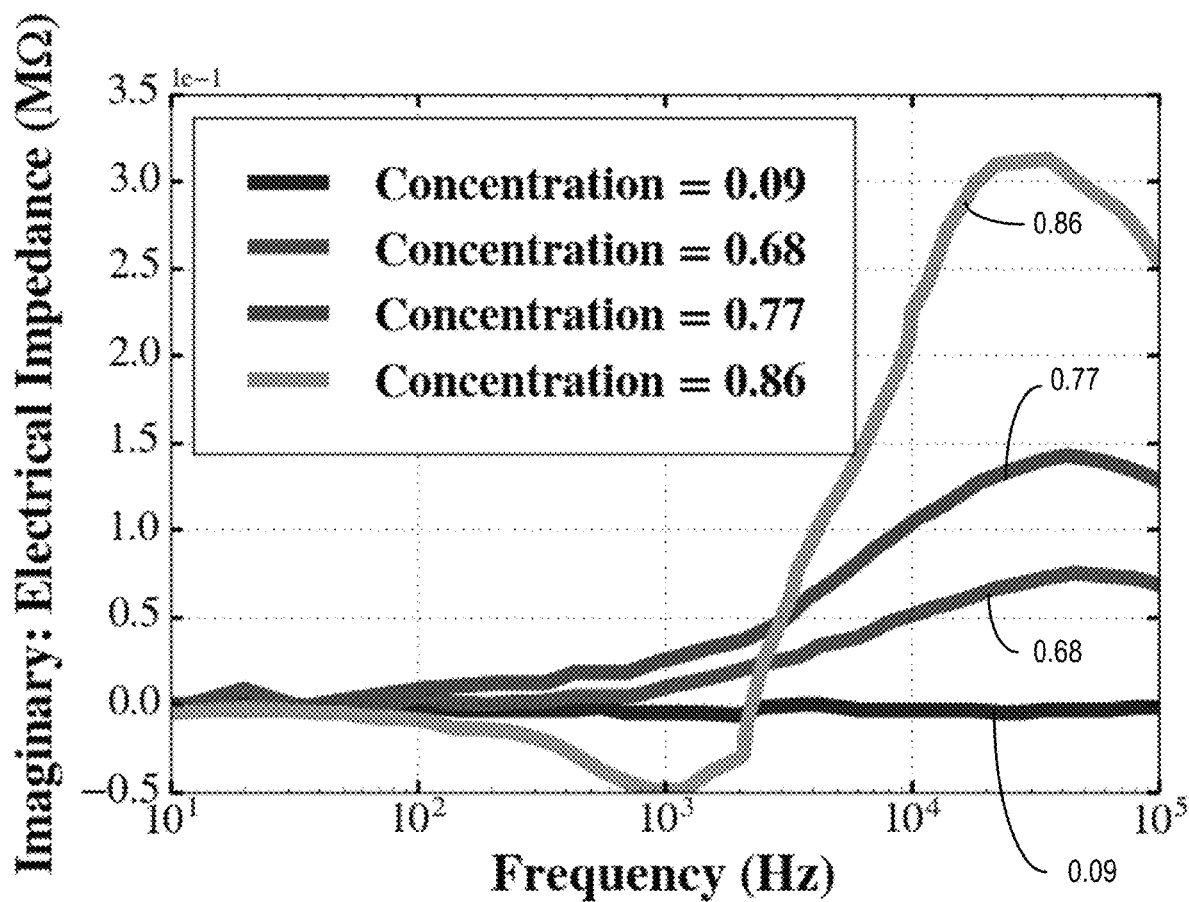
FIG. 3 is a graph of impedance with respect to frequency for different fluid concentrations.

FIG. 3 is a graph of electrical impedance with respect to alternating current frequency for different brine concentrations, obtained from "Kavian, M., Slob, E. C., & Mulder, W. A. (2012). A new empirical complex electrical resistivity model. Geophysics, 77(3), E185-E191." As can be seen from the concentration curves, electrical impedance varies significantly for different brine concentrations at frequencies above approximately 100 Hz. Similar variations can occur for oil/water, oil/gas, and other mixture concentrations, and such signatures can be detected in different EIT inspection methods and apparatus examples disclosed herein.

Figure 4:
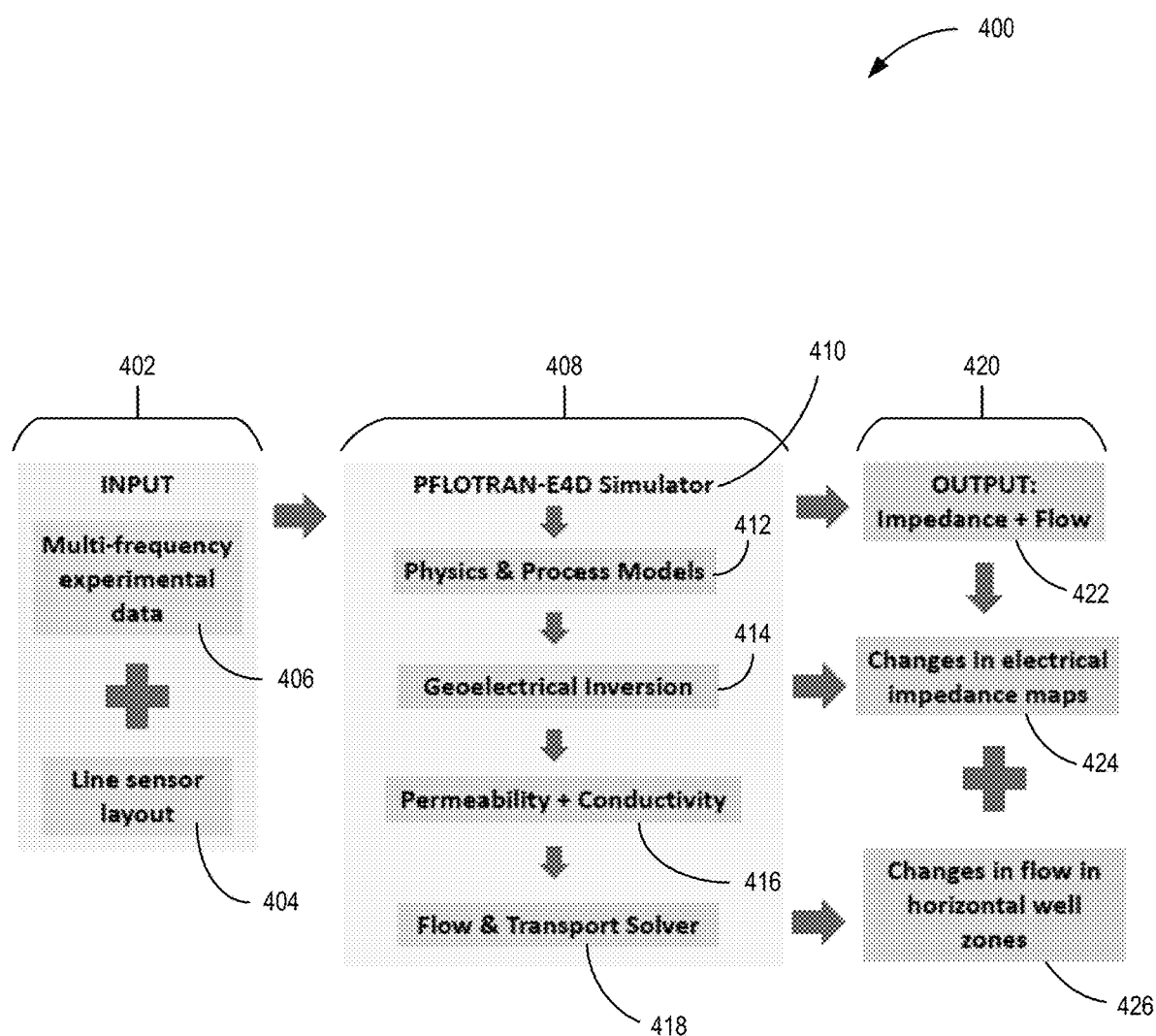
FIG. 4 is a flowchart of an example method.

FIG. 4 shows an example of a method 400 of MF-EIT that can be used, e.g., in determining flow variations in a well, such as a horizontal fracking well, including 3-D volume and 2-D layer estimates. At 402, various inputs are obtained, including a spatial positioning layout data 404 of a plurality of line sensors that are arranged proximate a predetermined geological region of interest (e.g., near an oil or gas well site, a groundwater region, or a carbon sequestration site) to transmit and receive MF-EIT signals. The inputs also include the MF-EIT data 406 obtained from generating the MF-EIT signals (e.g., voltage inputs, current inputs, etc.) and detecting the MF-EIT response signals (e.g., voltage outputs, current outputs, etc.) at the various line sensors arranged in a predetermined layout, such as a Wenner array, Schlumberger array, Dipole-dipole array, circular array, etc. At 408, the layout data 404 and the MF-EIT data 406 are used as inputs to an inverse problem simulator 410. The simulator 410 uses multi-frequency physical models 412 (e.g., Cole-Cole, Cole-Cole variants, hyperbolic models, etc.) of electric field penetration that solves Maxwell's equations and fluid flow processes that solves mass balance equation along with Darcy's law through geologic media (e.g., subsurface rocks, gas, oil, water, and various hydrocarbon mixtures) at multiple frequencies, together with the data 404, 406 to solve the inverse problem 414 of finding the electric potentials or impedances across the predetermined geological region of interest. Inversion algorithms can include Levenberg-Marquardt, Gradient Descent, Conjugate Gradient methods, along with regularization techniques such as Tikhonov regularization, etc. The various algorithms herein may be, for example, embodied as software or firmware instructions carried out by a digital computer or controller. With impedance or electric potential estimates generated, an empirical relationship between conductivity and geological permeability 416 can be used, for example using Archie's law of petrophysics, to provide field estimates for permeability across the predetermined geological region of interest, including 2-D layers and 3-D volumes, based on the impedance mapping. In some examples, predictions can be made without flow data from an associated well by using the impedance data. Any additional flow data, such as flow rates in the associated well, can be helpful in constraining the inversion processes and reduce the uncertainty in the solution obtained. A forward solve 418 can be performed based on the permeability estimates 416 and one or more pressure conditions (e.g., pump pressures provided by one or more well pump stages) to determine a flowrate mapping through the predetermined geological region of interest. Related outputs 420 can be provided from the simulator 410 can include electrical impedance and fluid flow data predictions 422. The MF-EIT analysis can be performed at different times to determine electrical impedance map variations over time 424. Data outputs from the forward solve 418 can include flow rate predictions and variations in flowrate data 426 that can correspond to variations in outputs for different well stages. For example, after permeability maps are obtained from the inversion process via impedance inversion, the permeabilities can be used to perform the forward solve. The forward solve again solves the mass balance for fluid in the system along with Darcy's law (which describes fluid movement through porous media). The solution can provide pressure values at every point in the system which can then be used in Darcy's law to obtain the flow rate at every point, thereby we can then see which regions are producing and which regions are not producing.

Figure 5:
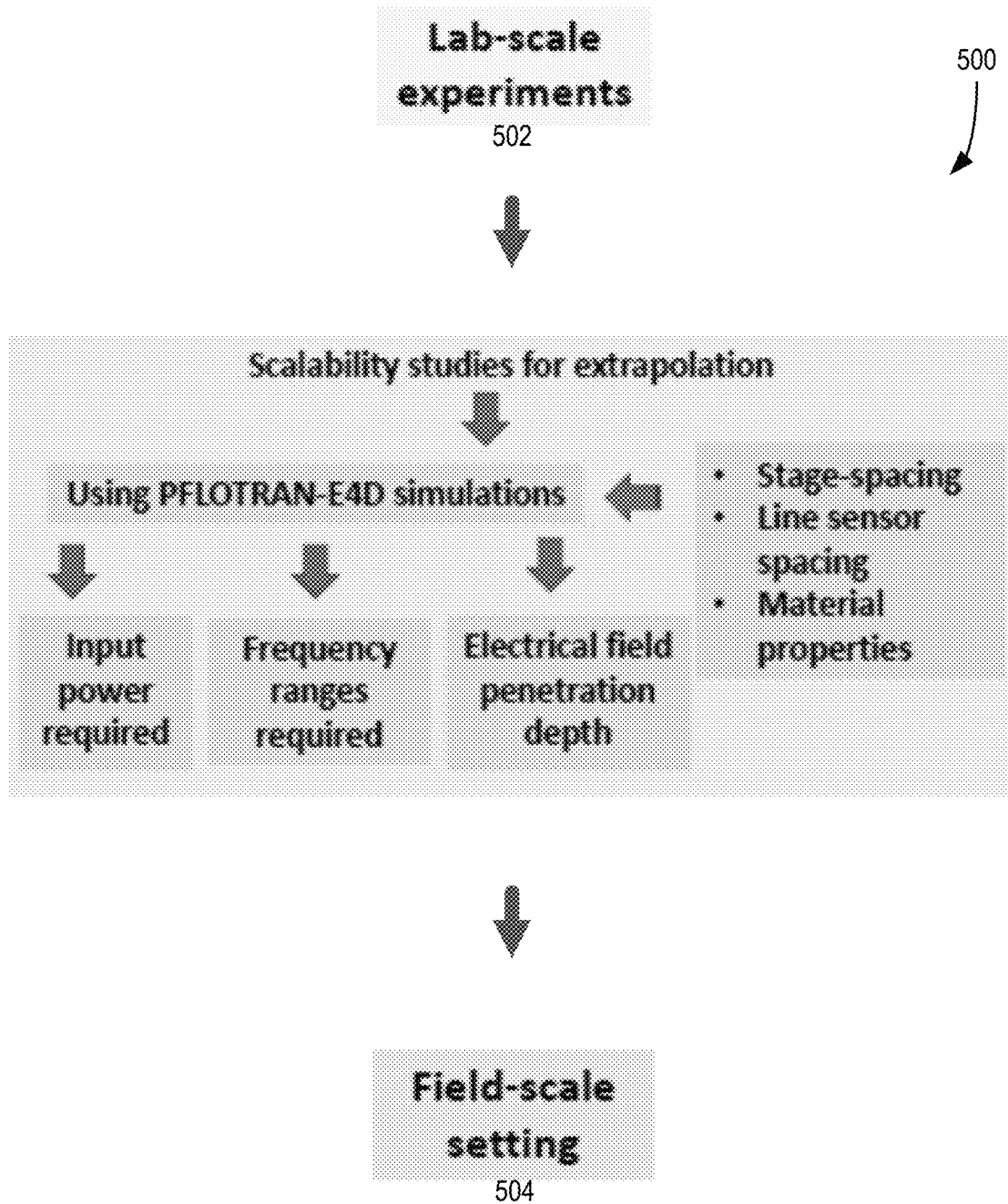
FIG. 5 is a flowchart of an example scaling technique.

FIG. 5 an example of a scaling technique 500 that can be used to scale MF-EIT methods from smaller lab-scale experiments 502 to larger field-scale environments 504, such as oil and gas well sites. For example, a smaller scale geological region can be fabricated for testing purposes, such as by using a geologic test volume of 1000 $cm^3$ having selected material properties, including one or more stages in predetermined positions that can be similar to well stages or geological variations (e.g., material, density, fluid/gas, etc.). The geologic test volume can include a plurality of line sensors arranged with a selected line sensor spacing to detect and/or receive MF-EIT signals. MF-EIT signals can be transmitted and detected with the line sensors, data collected, and simulations performed using inverse solvers to determine an electrical impedance mapping. Mappings can be compared with more detailed measurements of the field characteristics throughout the geologic test volume to verify accuracy and conformance with physical models. Different parameters can be varied, such as test volume material or configuration, sensor spacing, etc., and simulation tests repeated. A knowledge base of input power requirements, suitable frequency ranges for MF-EIT signals, and electrical field penetration depth can be created and monitored with respect to variations in test parameters. Suitable field-scale parameter values can be extrapolated based on the data generated from the lab-scale experiments 502.

Figure 6:
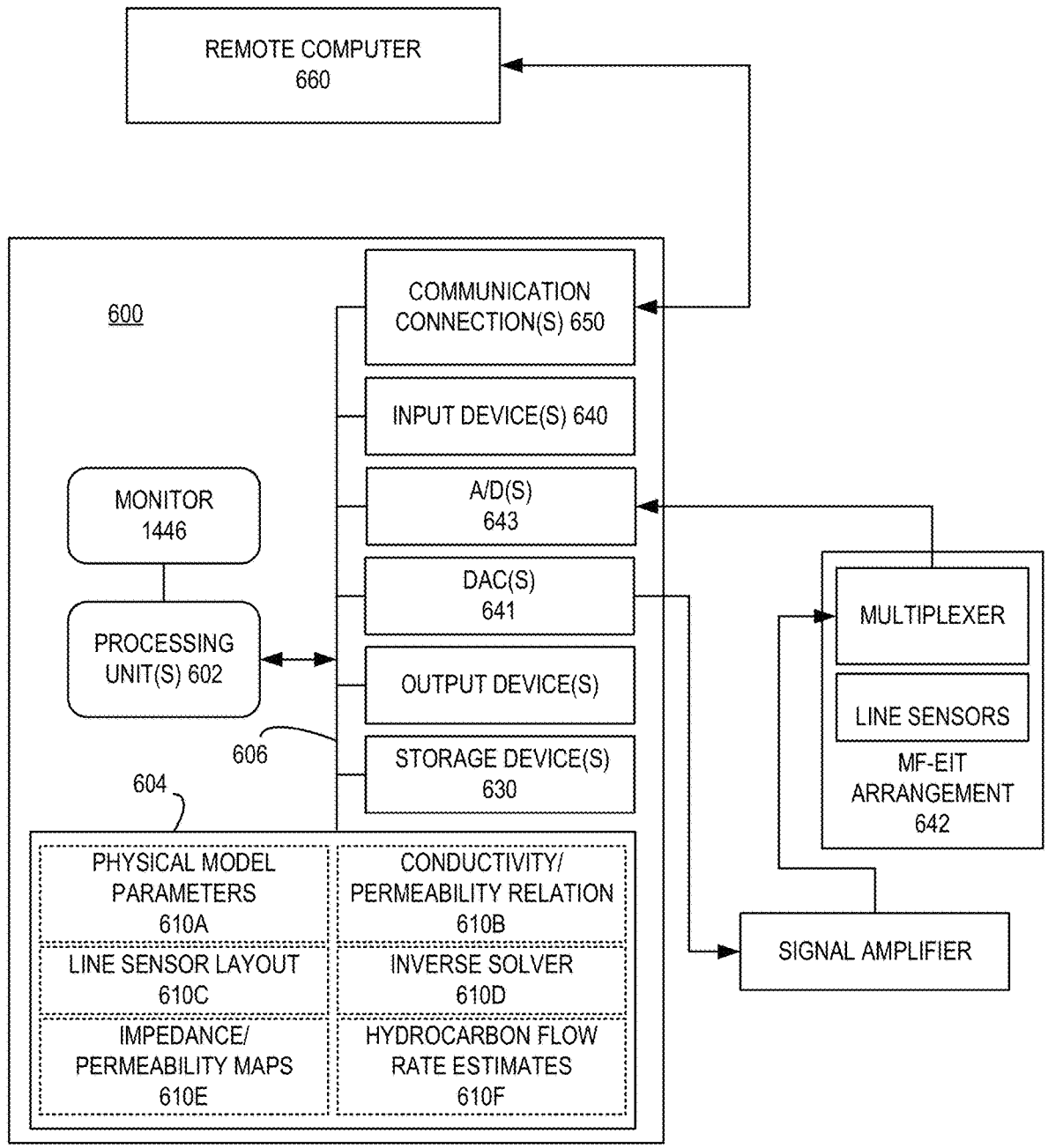
FIG. 6 is a schematic of an example computing environment and computing device.

FIG. 6 and the following discussion are intended to provide a brief, general description of an exemplary computing environment in which the disclosed technology may be implemented. Although not required, the disclosed technology is described in the general context of computer-executable instructions, such as program modules, being executed by a computing unit, dedicated processor, or other digital processing system or programmable logic device. Generally, program modules include routines, programs, objects, components, data structures, etc., that perform particular tasks or implement particular abstract data types. Moreover, the disclosed technology may be implemented with other computer system configurations, including handheld devices, multiprocessor systems, microprocessor-based or programmable consumer electronics, network PCs, minicomputers, mainframe computers, dedicated processors, MCUs, PLCs, ASICs, FPGAs, CPLDs, systems on a chip, and the like. The disclosed technology may also be practiced in distributed computing environments where tasks are performed by remote processing devices that are linked through a communications network. In a distributed computing environment, program modules may be located in both local and remote memory storage devices.

With reference to FIG. 6, an exemplary system for implementing the disclosed technology includes a computing device 600 that includes one or more processing units 602, a memory 604, and a system bus 606 that couples various system components including the system memory 604 to the one or more processing units 602. The system bus 606 may be any of several types of bus structures including a memory bus or memory controller, a peripheral bus, and a local bus using any of a variety of bus architectures. The memory 604 can include various types, including volatile memory (e.g., registers, cache, RAM), non-volatile memory (e.g., ROM, EEPROM, flash memory, etc.), or a combination of volatile and non-volatile memory. The memory 604 is generally accessible by the processing unit 602 and can store software in the form computer-executable instructions that can be executed by the one or more processing units 602 coupled to the memory 604. In some examples, processing units can be configured based on RISC or CSIC architectures, and can include one or more general purpose central processing units, application specific integrated circuits, graphics or co-processing units or other processors. In some examples, multiple core groupings of computing components can be distributed among system modules, and various modules of software can be implemented separately The exemplary computing device 600 further includes one or more storage devices 630 such as a hard disk drive for reading from and writing to a hard disk, a magnetic disk drive for reading from or writing to a removable magnetic disk, and an optical disk drive for reading from or writing to a removable optical disk (such as a CD-ROM or other optical media). Such storage devices can be connected to the system bus 606 by a hard disk drive interface, a magnetic disk drive interface, and an optical drive interface, respectively. The drives and their associated computer-readable media provide nonvolatile storage of computer-readable instructions, data structures, program modules, and other data for the computing device 600. Other types of non-transitory computer-readable media which can store data that is accessible by a PC, such as magnetic cassettes, flash memory cards, digital video disks, CDs, DVDs, RAMs, ROMs, and the like, may also be used in the exemplary computing environment. The storage 630 can be removable or non-removable and can be used to store information in a non-transitory way and which can be accessed within the computing environment.

As shown in FIG. 6, the computing device 600 is coupled to one or more digital to analog convertors (DACs) 641 so that suitable MF-EIT modality signals (e.g., AC currents) are provided to selected line sensors of a deployed MF-EIT electrode arrangement 642 through a multiplexer and signal amplifier to produce and transmit MF-EIT signals through a subsurface geological medium proximate the line sensors. Analog to digital convertors (A/Ds) 643 are coupled to the bus 606 so that data values such as MF-EIT response signals detected with the line sensors can be stored as digital values. In representative examples, the response signal values are compared with the transmitted MF-EIT signals and analyzed to create one or more electrical impedance maps of the subsurface geological medium (e.g., a horizontal fracking zone). As shown in FIG. 6, physical model parameters for electrical transmission through geologic media are stored in a memory 610A along with conductivity/permeability relations in a memory 610B, and line sensor spatial positioning information in a memory 610C. Inverse solver instructions are stored in a memory 610D, and inverse solver outputs, such as electrical impedance and permeability maps (including at different times or time-evolved differences between maps) are stored in a memory 610E. Forward solved flow-rate information can be stored in a memory 610F.

A number of program modules (or data) may be stored in the storage devices 630 including an operating system, one or more application programs, other program modules, and program data. A user may enter commands and information into the computing device 600 through one or more input devices 640 such as a keyboard and a pointing device such as a mouse. Other input devices may include a digital camera, microphone, satellite dish, scanner, display, or the like. These and other input devices are often connected to the one or more processing units 602 through a serial port interface that is coupled to the system bus 606, but may be connected by other interfaces such as a parallel port, game port, or universal serial bus (USB). A monitor 646 or other type of display device is also connected to the system bus 606 via an interface, such as a video adapter. Some or all data and instructions can be communicated with a remote computer 660 through communication connections 650 (e.g., wired, wireless, etc.) if desired.

Figure 7:
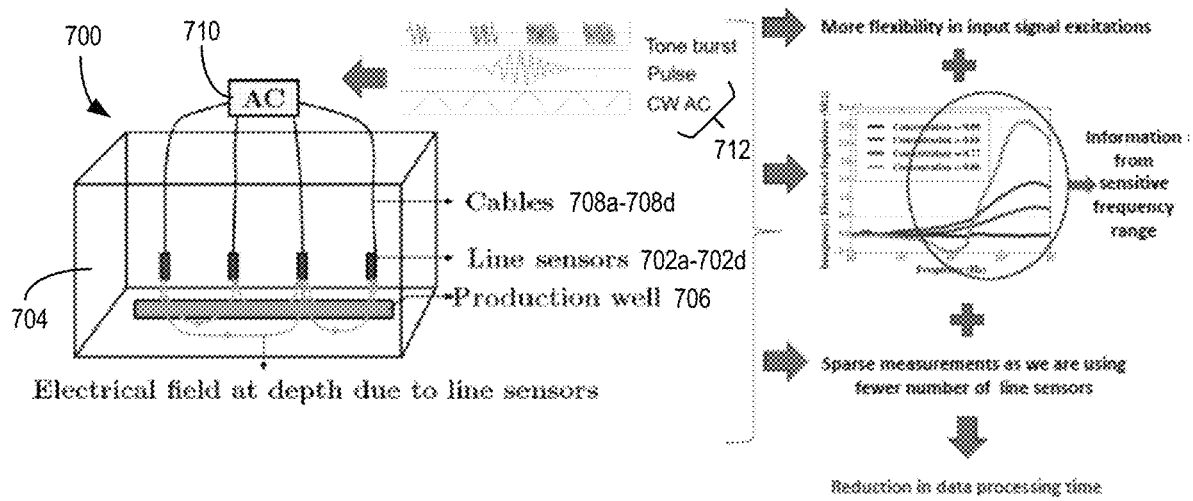
FIG. 7 is schematic of an example MF-EIT apparatus.

FIG. 7 shows an example MF-EIT system 700 that includes a plurality vertical line sensors 702a-702d situated in a subsurface geologic region 704 proximate a horizontal hydrocarbon production well 706. The line sensors 702a-702d are coupled via respective cables 708a-708d to an AC source 710 configured to direct various AC signals 712 to the line sensors in a predetermined sequence. The use of multiple frequencies provides additional flexibility in input signal excitations, which can be varied or tailored to correspond to more sensitive frequency ranges for different geological media. Also, the use of multiple frequencies can allow fewer line sensors to be used, reducing the quantity of line sensors used in the electrical impedance mapping process and reducing the number of measurements. A reduction in the duration of data processing can be obtained based on the smaller quantity of sensors and measurements.

Figure 8:
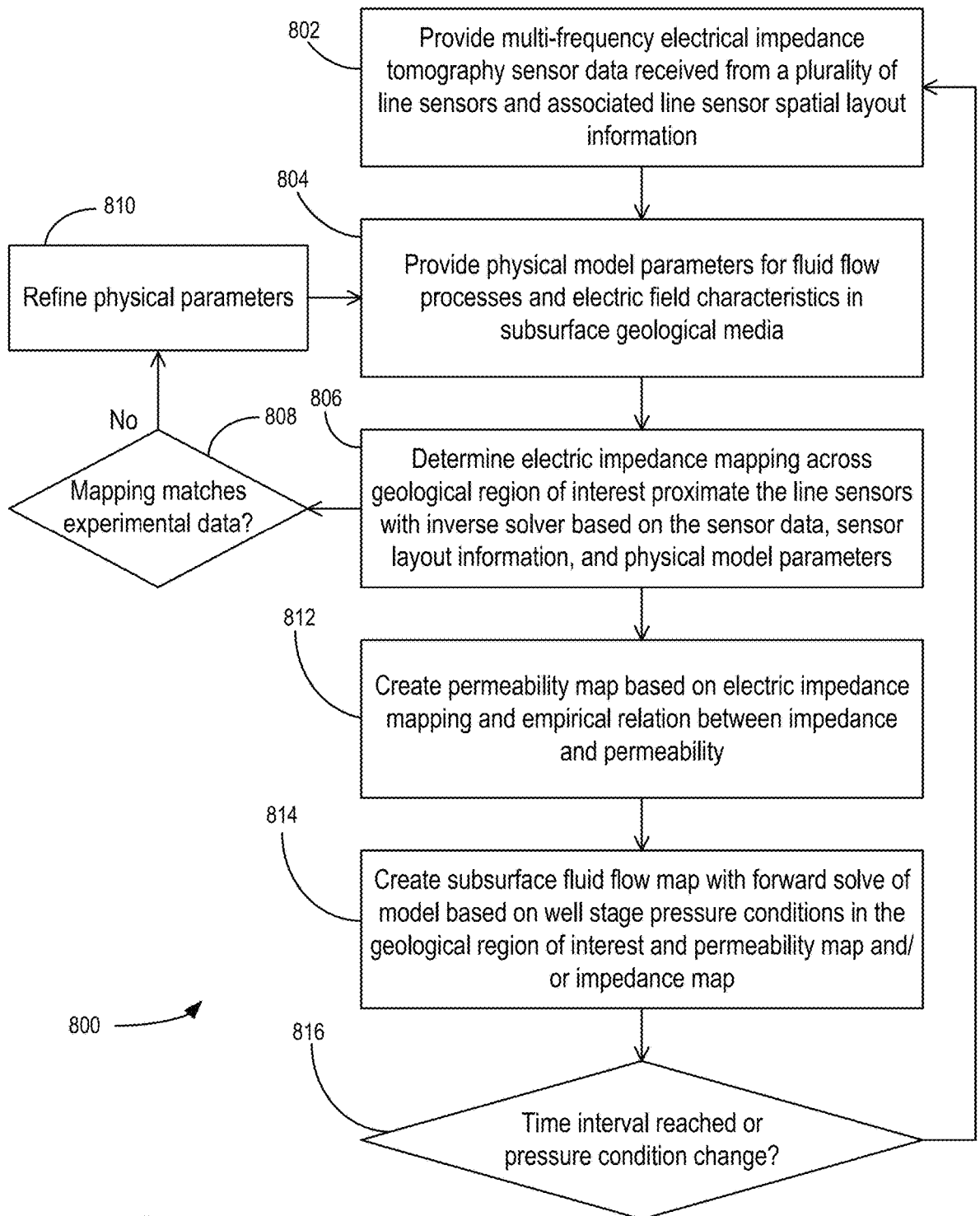
FIG. 8 is a flowchart of another example method.

FIG. 8 shows an example method 800 of producing impedance and fluid flow maps using MF-EIT. At 802, MF-EIT sensor data is received from a plurality of line sensors situated in a geological region of interest, such as a groundwater region, mine, horizontal fracking zone, etc. In typical examples, the line sensors are vertically arranged and sparsely arranged to reduce the amount measurements received and to reduce subsequent data processing time. The MF-EIT sensor data is typically received by a computing device, such as a sensor controller, and also includes spatial layout information of the line sensors in the geological region of interest. In fracking examples, line sensors are typically vertically situated 100's to 1000's of meters below the surface of the Earth, and need not be situated directly above a horizontal well pipe associated with the horizontal fracking zone. At 804, physical model parameters for electric field characteristics (e.g., penetration depth, strength, etc.) and fluid flow processes through porous subsurface geological media are estimated and provided to the computing device.

At 806, an inverse problem solver in the computing device is used to determine an electrical impedance mapping across the geological region of interest (e.g., 2D, 3D) based on the provided line sensor data, line sensor layout information, and the physical model parameters. At 808, the electrical impedance mapping solution can be compared to experimental data to determine if there is sufficient correspondence (e.g., based on one or more error thresholds). If a lack of correspondence is observed, the physical model parameters can be refined at 810, and new physical model parameters can be generated at 804. At 812, a permeability map or point estimates can be generated based on the electrical impedance mapping obtained at 806 and one or more empirical relationships between electrical impedance and porous geological media. At 814, a fluid flow mapping is created using a forward solve of the physical model based on known pressure conditions associated with the geological region of interest (such as pumping pressures at respective well stages) and the generated permeability map and/or the electrical impedance mapping. At 816, after a sufficient time interval, a change in pressure condition, or other trigger, the process of obtaining sensor data and producing impedance, permeability, and/or flow mappings can be repeated. In this way, the geological region of interest can be monitored for variations in flow, volume, or other characteristics.

Having described and illustrated the principles of the disclosed technology with reference to the illustrated embodiments, it will be recognized that the illustrated embodiments can be modified in arrangement and detail without departing from such principles. For instance, elements of the illustrated embodiments shown in software may be implemented in hardware and vice-versa. Also, the technologies from any example can be combined with the technologies described in any one or more of the other examples. It will be appreciated that procedures and functions such as those described with reference to the illustrated examples can be implemented in a single hardware or software module, or separate modules can be provided. The particular arrangements above are provided for convenient illustration, and other arrangements can be used.

In view of the many possible embodiments to which the principles of the disclosed technology may be applied, it should be recognized that the illustrated embodiments are only representative examples and should not be taken as limiting the scope of the disclosure. Alternatives specifically addressed in these sections are merely exemplary and do not constitute all possible alternatives to the embodiments described herein. For instance, various components of systems described herein may be combined in function and use. We therefore claim all that comes within the scope of the appended claims.

We claim:

1. An apparatus, comprising:
   a plurality of geological subsurface electrical line sensors spaced apart from each other proximate a predetermined geological subsurface region of interest, with at least one of the electrical line sensors situated as a line source to produce a multi-frequency electrical impedance tomography source signal, and with at least one of the electrical line sensors situated as a line detector to receive the multi-frequency electrical impedance tomography response signal associated with the source signal that propagates through the predetermined geological subsurface region of interest; and
   a controller including a processor and a memory configured with instructions that, when executed by the processor, cause the processor to determine an electrical mapping over the predetermined geological subsurface region of interest based on the multi-frequency electrical impedance tomography source signal, response signal, and the spatial positions of the geological subsurface electrical line sensors.

2. The apparatus of claim 1, wherein the memory is configured with instructions that cause the processor to determine a variation over time of the electric potential mapping that corresponds to a net hydrocarbon flow in the predetermined geological subsurface region of interest.

3. The apparatus of claim 1, wherein the memory is configured with instructions that cause the processor to determine a flow rate mapping over the predetermined geological subsurface region of interest based on the electrical mapping and an empirical relation between geological permeability and electrical conductivity.

4. The apparatus of claim 1, wherein the predetermined geological subsurface region of interest is a horizontal fracking zone having a plurality of producing and/or non-producing stages.

5. The apparatus of claim 4, wherein the memory is configured with instructions that cause the processor to determine a production level of one or more stages of the horizontal fracking zone based on the electrical mapping.

6. The apparatus of claim 5, wherein the controller is coupled to one or more fracking pumps coupled to one or more of the stages and configured to vary a pumping level of the one or more fracking pumps based on a flowrate estimate associated with the electrical mapping.

7. The apparatus of claim 1, wherein at least one of the electrical line sensor is situated in an abandoned well bore.

8. The apparatus of claim 1, wherein the electrical line sensors are vertically arranged and approximately parallel to each other and the predetermined geological subsurface region of interest includes a horizontal fracking zone including a plurality of stages spaced apart along the horizontal fracking zone.

9. The apparatus of claim 1, wherein the multi-frequency source signal includes one or more of a tone burst, an electric pulse, or a continuous-wave signal.

10. The apparatus of claim 1, wherein the electrical line sensors are spaced apart from each other in a sparse configuration.

11. The apparatus of claim 1, further comprising:
    a multiplexer electrically coupled to the subsurface electrical line sensors and configured to select which of the electrical line sensors is configured to send the source signal and which of the electrical line sensors are configured to receive the response signal; and
    a multi-frequency electrical source and a signal receiver coupled to the multiplexer.

12. A method, comprising:
    directing a multi-frequency alternating-current electrical impedance tomography source signal from at least one geological subsurface electrical line sensor situated at a selected subsurface geological position, through an adjacent geological region;
    receiving a multi-frequency alternating-current electrical impedance tomography response signal at a plurality of other geological subsurface electrical line sensors at respective sparsely situated subsurface geological positions spaced apart from the at least one geological subsurface electrical line sensor providing the source signal, associated with the at least one geological subsurface electrical line sensor producing the source signal; and
    determining an electrical mapping over a predetermined geological region of interest of the adjacent geological region based on the multi-frequency alternating-current electrical impedance tomography source signal, response signal, and the spatial positions of the geological subsurface electrical line sensors.

13. The method of claim 12, wherein the determining of the electrical mapping includes determining variation of the electrical mapping over time.

14. The method of claim 12, further comprising, determining a flow rate mapping over the predetermined geological region of interest based on the electrical mapping and an empirical relation between geological permeability and electrical conductivity.

15. The method of claim 12, determining a production level of one or more stages of a horizontal fracking zone based on the electrical potential mapping.

16. The method of claim 15, varying a pump level of a stage of a horizontal fracking zone based on the determined production level.

17. The method of claim 12, wherein the source signal and response signal are, respectively, a current signal and a voltage signal, a voltage signal and a current signal, or voltage signals.

18. The method of claim 12, wherein the multi-frequency source signal includes one or more of a tone burst, an electric pulse, or a continuous-wave signal.

19. The method of claim 12, wherein at least one of the line sensors is situated in an abandoned well bore.

20. The method of claim 12, wherein each of the line sensors include a line sensor length of at least 1 meter situated at the corresponding subsurface geological positions at an end of a cable that extends from the end a length of at least 100 meters towards a surface.

21. The method of claim 12, wherein the directing the source signal includes directing the source signal from an AC source to a multiplexer situated to select one or more of the geological subsurface electrical line sensors for sending the source signal or receiving the response signal;
   wherein the receiving the response signal includes receiving the response signal from one or more of the electrical line sensors coupled to the multiplexer and directing the response signal from the multiplexer to a signal receiver.

22. The method of claim 12, wherein the predetermined geological region of interest corresponds to a fracking zone, a groundwater region, a geothermal region, or a carbon sequestration region.

* * * * *